(12) United States Patent
Takayasu et al.

(10) Patent No.: US 11,783,968 B2
(45) Date of Patent: Oct. 10, 2023

(54) CABLING METHOD OF SUPERCONDUCTING FLAT WIRES

(71) Applicants: Massachusetts Institute of Technology, Cambridge, MA (US); Brookhaven Technology Group, Inc., Stony Brook, NY (US)

(72) Inventors: Makoto Takayasu, Lexington, MA (US); Vyacheslav Solovyov, Rocky Point, NY (US)

(73) Assignees: Massachusetts Institute of Technology, Cambridge, MA (US); Brookhaven Technology Group, Inc., Glen Cove, NY (US)

( * ) Notice: Subject to any disclaimer, the term of this patent is extended or adjusted under 35 U.S.C. 154(b) by 104 days.

(21) Appl. No.: 17/245,863

(22) Filed: Apr. 30, 2021

(65) Prior Publication Data

US 2021/0350957 A1    Nov. 11, 2021

Related U.S. Application Data

(60) Provisional application No. 63/101,581, filed on May 7, 2020.

(51) Int. Cl.
*H01B 12/00* (2006.01)
*H01B 12/08* (2006.01)
(Continued)

(52) U.S. Cl.
CPC ............. *H01B 12/08* (2013.01); *H01B 12/06* (2013.01); *H01B 12/16* (2013.01); *H01B 13/282* (2013.01)

(58) Field of Classification Search
CPC ........ H01B 12/08; H01B 12/06; H01B 12/16; H01B 13/282
See application file for complete search history.

(56) References Cited

U.S. PATENT DOCUMENTS 8,437,819 B2    5/2013  Takayasu et al.
9,183,970 B2   11/2015  Maeda et al.
(Continued)

FOREIGN PATENT DOCUMENTS

CN    102867601 A    1/2013
GB      2578307 A    5/2020
(Continued)

OTHER PUBLICATIONS

WO 03012460 A2 (Year: 2003).*
(Continued)

*Primary Examiner* — Pete T Lee
(74) *Attorney, Agent, or Firm* — DALY, CROWLEY, MOFFORD & DURKEE LLP

(57) ABSTRACT

A structure and method provide cables of high-temperature superconducting flat tape and/or filament wires, with a small bending diameter. A cable has a former having cross section that includes a rectangle having rounded ends (i.e. an obround), and the flat tape is wound around the surface of the former at an angle to minimize bending. The former surface may have raised helical ribs or lowered grooves to provide tape registration in multi-layer configurations. Tape may be wound from a spool onto the former under tension, and cut with a laser cutter to produce fine filaments immediately before winding. The former may be slit longitudinally to prevent loop eddy currents and reduce AC losses. The wound cable may be jacketed to provide a cable-in-conduit conductor (CICC), and coolant channels may be provided in the jacket or in the former.

19 Claims, 13 Drawing Sheets

(51) Int. Cl.
  *H01B 13/28* (2006.01)
  *H01B 12/16* (2006.01)
  *H01B 12/06* (2006.01)

(56) References Cited

U.S. PATENT DOCUMENTS

| | | | |
|---|---|---|---|
| 10,062,485 | B2 | 8/2018 | Iwasa et al. |
| 10,079,092 | B2 | 9/2018 | Iwasa et al. |
| 2008/0164048 | A1* | 7/2008 | Hirose .................. H01B 12/06 174/15.5 |
| 2009/0082210 | A1* | 3/2009 | Ashibe .................. H01B 12/14 174/125.1 |
| 2010/0099570 | A1 | 4/2010 | Takayasu et al. |
| 2012/0015815 | A1* | 1/2012 | Allais .................. H01L 39/248 505/433 |
| 2014/0302997 | A1 | 10/2014 | Takayasu |
| 2016/0155541 | A1 | 6/2016 | Jenner et al. |
| 2017/0338009 | A1* | 11/2017 | van der Laan ........ H01B 12/08 |
| 2018/0226730 | A1 | 8/2018 | Fietz et al. |

FOREIGN PATENT DOCUMENTS

| | | |
|---|---|---|
| WO | WO 2008/011184 | 1/2008 |
| WO | WO 2010/042259 | 4/2010 |
| WO | WO 2014/201242 A1 | 12/2014 |
| WO | WO 2021/178697 | 9/2021 |
| WO | PCT/US2022/030047 | 5/2022 |

OTHER PUBLICATIONS

Investigation of Rutherford cable using coated conductor Roebel cables as strands (Year: 2013).*
PCT International Search Report and Written Opinion dated Feb. 1, 2022 for International Application No. PCT/US2021/30207; 13 Pages.
Kario, et al. "Investigation of a Rutherford Cable Using Coasted Conductor Roebel Cables as Strands"; Superconductor Science Technology 26 (2013) 085019 (6pp); http://iopscience.iop.org/0953-2048/26/8/085019; Published on Jul. 4, 2013; 7 Pages.
PCT International Preliminary Report On Patentability dated Nov. 17, 2022 for International Application No. PCT/US2021/030207; 10 Pages.
International Search Report and Written Opinion of the ISA dated Jun. 25, 2021 for International Application No. PCT/US2021/020916; 15 Pages.
Yanagi et al.; "Feasibility of HTS Magnet Option for Fusion Reactors"; Plasma and Fusion Research: Regular Articles; vol. 9, 1405013; 2014; 6 Pages.
Hasegawa, et al.; "12 kA HTS Rutherford Cable"; IEEE Transactions on Applied Superconductivity; vol. 14; No. 2; Jun. 2004; 4 Pages.
Hasegawa, et al.; "Improvement of Superconducting Properties of Bi-2212 Round Wire and Primary Test Results of Large Capacity Rutherford Cable"; IEEE Transactions on Applied Superconductivity; vol. 11; No. 1; Mar. 2001; 4 Pages.
Kario, et al.; "Investigation of a Rutherford cable using coated conductor Roebel cables as strands"; Superconductor Science and Technology; 26; Jul. 4, 2013; 7 Pages.
Schlachter, et al.; "Coated Conductor Rutherford Cables (CCRC) for High-Current Applications: Concept and Properties"; IEEE Transactions on Applied Superconductivity; vol. 21; No. 3; pp. 3021-3024; Jun. 2011;4 Pages.
Selvamanickam, et al.; "Fully-filamentized HTS coated conductors by striation and selective electroplating"; Coated Conductors for Applications; Nov. 13-16, 2012; 21 Pages.
Selvamanickam, et al.; "Scale Up of Applications—Ready Practical Y—Ba_Cu_O Coated Conductors"; IEEE Transactions on Applied Superconductivity; vol. 15; No. 2; Jun. 2005; 4 Pages.
Solovyov, et al.; "Electromechanical properties of narrow superconducting cables comprised of exfoliated YBCO filaments"; Aug. 22, 2017; 5 Pages.
Solovyov, et al.; "Exfoliated YBCO filaments for second-generation superconducting cable"; Superconductor Science and Technology; 30; Jan. 2017; 10 Pages.
Sumption, et al.; "AC loss in striped (filamentary) YBCO coated conductors leading to designs for high frequencies and field-sweep amplitudes"; Superconductor Science and Technology; 18; pp. 122-134; Jan. 2005; 14 Pages.
Takayasu, et al.; "Conductor Characterization of YBCO Twisted Stacked-Tape Cables"; IEEE Transactions on Applied Superconductivity; vol. 23; No. 3; Jun. 2013; 4 Pages.
Takayasu, et al.; "HTS twisted stacked-tape cable conductor"; Superconductor Science and Technology; 25; Jan. 2012; 22 Pages.
Takayasu, et al.; "Investigation of Twisted Stacked-Tape Cable Conductor"; American Institute of Physics; pp. 273-280; Jan. 2012; 8 Pages.
Uglietti; "A review of commercial high temperature superconducting material for large magnets: from wires and tapes to cables and conductors"; Superconductor Science and Technology; Jan. 2019; 30 Pages.
Uglietti, et al.; "Design and Strand Tests of a Fusion Cable Composed of Coated Conductor Tapes"; IEEE Transactions on Applied Superconductivity; vol. 24, No. 3; Jun. 2014; 4 Pages.
Uglietti, et al.; "Test of 60kA coated conductor cable prototypes for fusion magnets"; Superconductor Science and Technology; 28; Nov. 2, 2015; 14 Pages.
Wikipedia; "Rutherford cable"; Mar. 30, 2020; 2 Pages.
Yanagi et al.; "Design and development of high-temperature superconducting magnet system with joint-winding for helical fusion reactor"; International Atomic Energy Agency; Nucl. Fusion 55; Apr. 22, 2015; 8 Pages.
Office Action dated Jun. 23, 2023 for U.S. Appl. No. 17/333,314; 9 Pages.

* cited by examiner

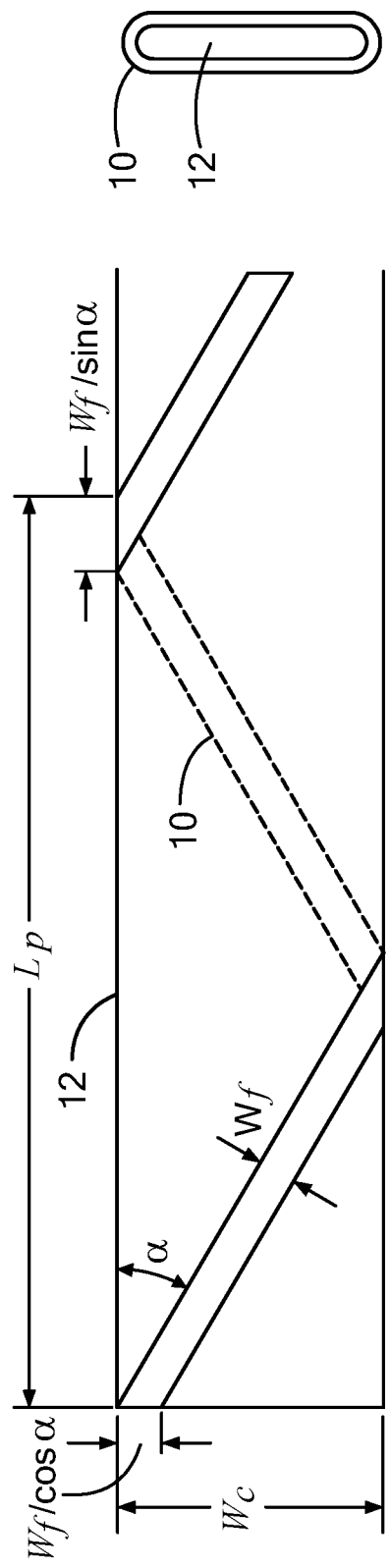
FIG. 1(a)
FIG. 1(b)
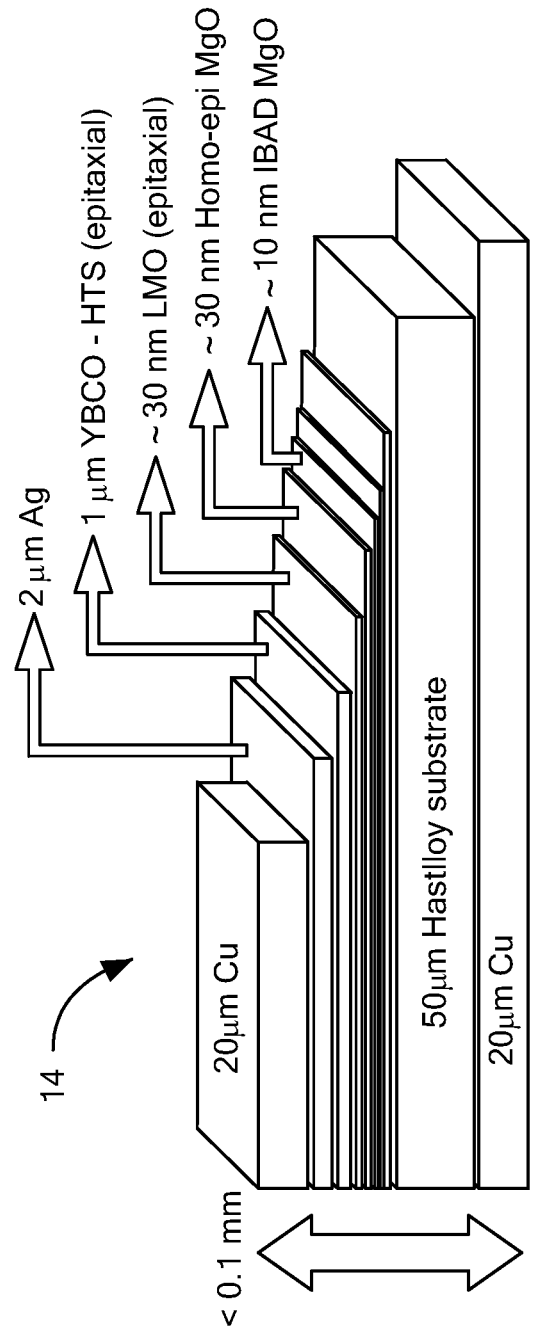
FIG. 1(c)

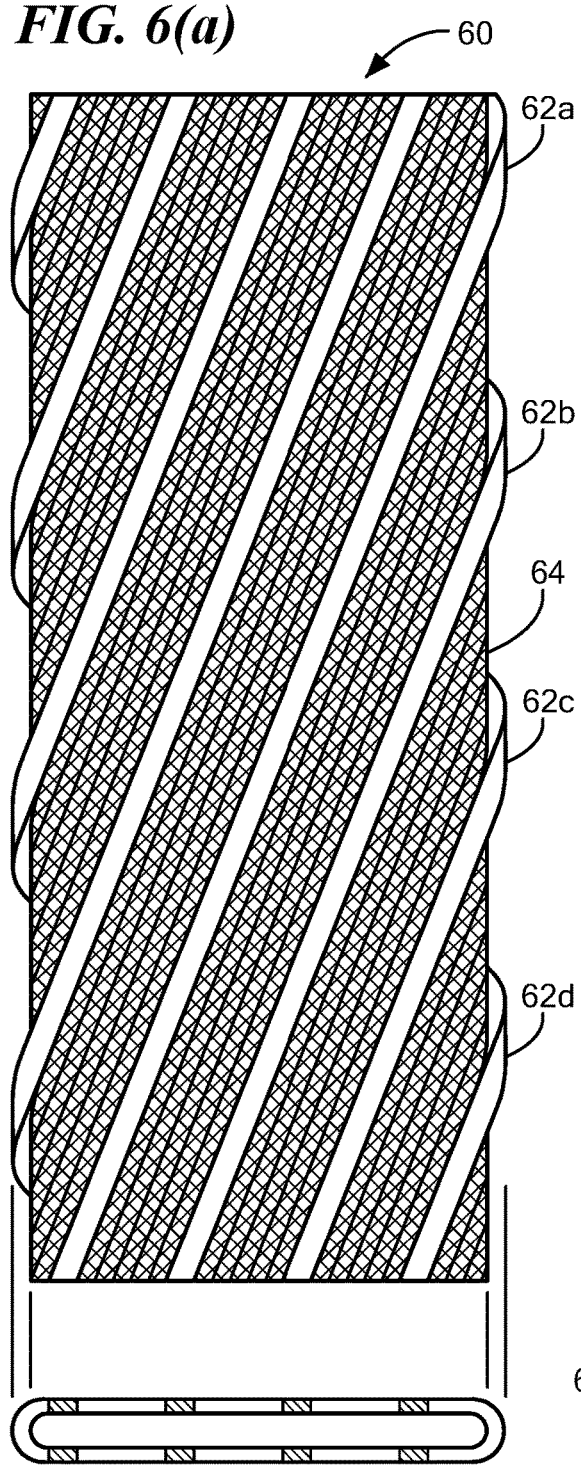
FIG. 6(a)
FIG. 6(b)
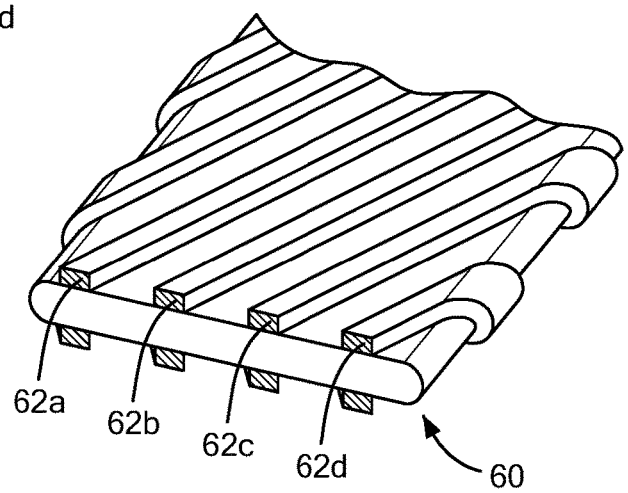
FIG. 6(c)

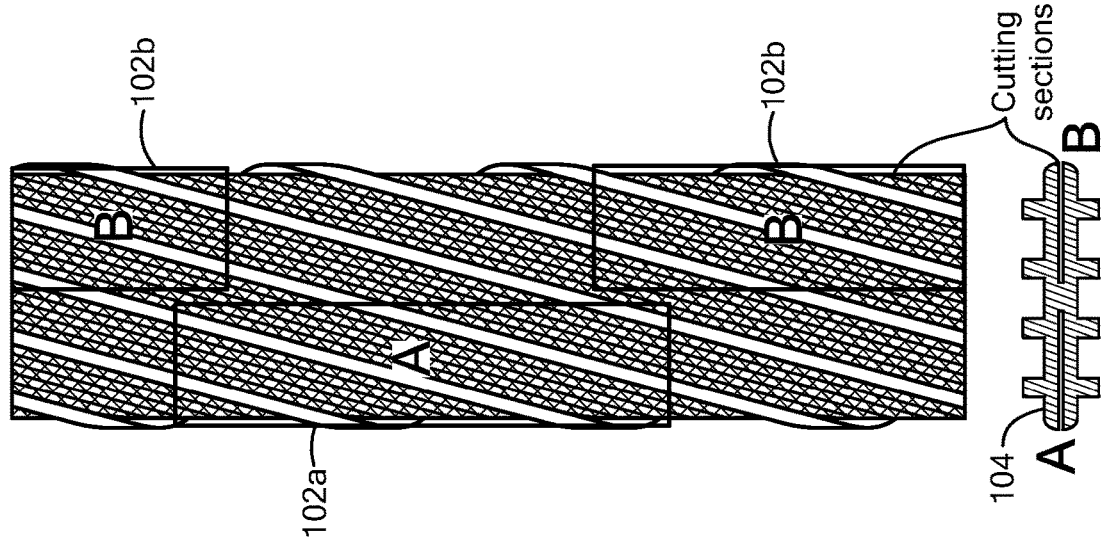
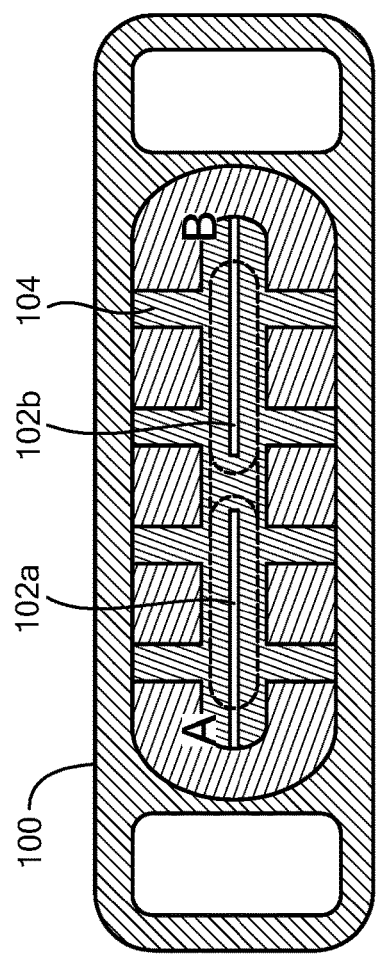
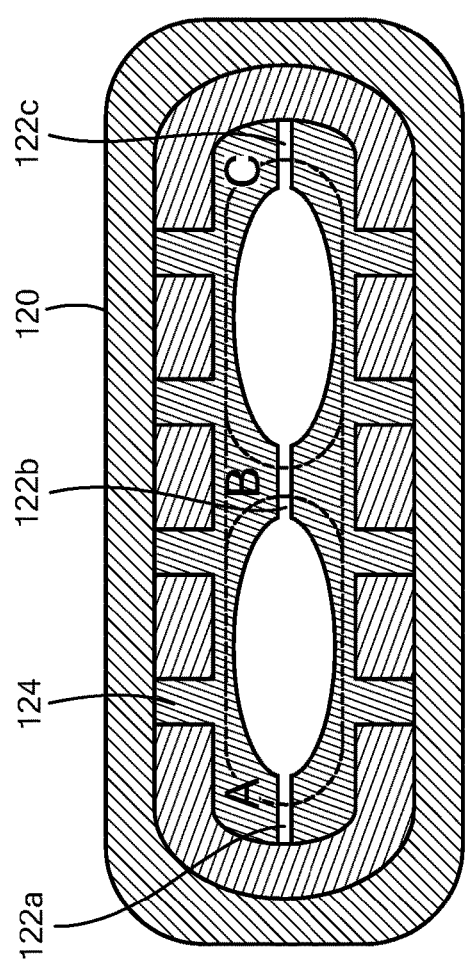
FIG. 10(a)
FIG. 10(b)
FIG. 10(c)

CABLING METHOD OF SUPERCONDUCTING FLAT WIRES

CROSS-REFERENCE TO RELATED APPLICATIONS

This application claims the benefit of U.S. Provisional Application 63/101,581, filed May 7, 2020, the entire contents of which are incorporated herein by reference.

STATEMENT REGARDING FEDERALLY SPONSORED RESEARCH

This invention was made with Government support under Grant No. DE-FC02-93ER54186 and DE-SC0018737 awarded by the Department of Energy. The Government has certain rights in the invention.

FIELD

The disclosure pertains generally to electrically conductive cables, and more particularly to superconductive cables characterized by flat tapes wound around a thin former.

BACKGROUND

High-temperature superconductors (HTS) are used in wires made from bismuth strontium calcium copper oxide (BSCCO) or rare earth barium copper oxide (REBCO) to provide excellent high-current performances at high magnetic fields (e.g. above about 5 Tesla). Cables made from HTS wires are used for various electric device applications such as transformers, fault current limiters, energy storage, magnets, fusion reactors and other high energy physics devices, and power transmission cables. These practical applications demand high current capacity cables without accompanying alternating current (AC) power losses or magnetic flux coupling losses.

The current capacity of cables can be increased by providing several superconducting wires in parallel. However, flux couplings created in loop currents through the superconducting wires generate significant AC resistive losses, and magnetic hysteresis. To reduce the magnetic flux coupling between superconducting wires, a transposition technique of superconducting wires, such as twisting, has been used.

If the superconducting wires are round, it is relatively simply to twist them around themselves along an axis to make a twisted cable. Alternately, they may be twisted around a base, called a "former", to produce a cable having a thin, flat geometry. For example, a so-called "Rutherford cable" is formed with round superconducting electrical wires arranged and wound helically around a flattened rectangular former to form a roughly rectangular cable. High current cables using a conventional Rutherford type cabling method have been manufactured using a round wire of BSCCO-2212 HTS superconductor.

While twisting technology works well with round wires, it has not been easily applied to thin, flat superconducting wires, such as coated HTS tapes that are typically less than 0.2 mm thick and between 4 mm and 12 mm wide. Long lengths of such tapes may be spool-wound. A major obstacle to cabling flat tapes is that the sharp edges or corners of the flat tapes are easily damaged by a twist cabling, and it degrades the performance of superconducting tapes.

Therefore, various other cabling methods for superconducting flat tapes have been developed. One such method is the Roebel Assembled Coated Conductor (RACC), in which Z-shaped flat tapes are woven together to form cable strands that may be bound together to form a final cable. Another method is Conductor-On-Round Core (CORC), in which flat tapes are wound around a circular core, avoiding sharp bends, with a relatively short twist-pitch resulting in poor wire usage. Yet another method is Twisted Stacked-Tape Cable (TSTC), in which a bundle of stacked flat tapes are twisted around their own longitude to create a roughly circular cable.

In one instance, a Roebel Assembled Coated Conductor (RACC) flat strand of REBCO conductors was secondarily wound around a rectangular former to make a Rutherford cable. However, the weaving of the strand resulted in a high bending diameter of between 10 mm and 15 mm, so this conductor required a proportionately large former. Consequently, the current density of the cable was capped below that often used in high current applications. Moreover, this geometry cannot be used with applications that require smaller bending diameters due to physical space constraints, or when using narrower, fine-filament superconducting wires that are advantageous in AC applications.

SUMMARY OF DISCLOSED EMBODIMENTS

It is an object of disclosed embodiments to provide a superconducting cable made of flat superconducting wires, such as a high-temperature superconductor (HTS) tape, that has a small bending diameter. Embodiments are useful for both alternating current (AC) and direct current (DC) applications that require high current-density superconducting cables with a small former (e.g. having a thickness on the order of 0.5 mm to 2 mm) and/or filament wires (e.g. having a width on the order of 0.1 mm to 5 mm). This cabling method is suitable for developing fine-flat-filament tape cables for a high current conductor for AC current applications such as industrial motors and generators, fusion and accelerator machines, as well as power transmission cables.

Disclosed embodiments provide a cable having a Rutherford-type shape, but using a superconducting flat tape rather than round wires, which advantageously allows for much smaller cables. The flat tapes are wound around a former in a manner similar to CORC cables, but having a different cross section that is suited to different applications. Embodiments thus have very different twist-pitch fabrication and cable structure, which leads to improved electromechanical performance.

Thus, a first embodiment is a superconducting cable comprising a former having a cross-section that includes an obround (that is, a rectangle with rounded ends); and one or more flat tapes, each flat tape comprising a superconductor and being wound helically onto the former. The superconductor may be a high-temperature superconductor (HTS).

In some embodiments, the former comprises a Rutherford-type cable former.

In some embodiments, the former has a thickness that is less than 20 mm.

In some embodiments, the former has a thickness that is between 1 mm and 5 mm.

In some embodiments, the former comprises raised helical ribs, and the one or more flat tapes are wound in parallel between the ribs.

In some embodiments, the raised helical ribs are made of one or more wires that are mounted or welded helically to a surface of the former.

In some embodiments, the former comprises helical grooves, and the one or more flat tapes each are displaced within a corresponding one of the grooves.

In some embodiments, the former comprises an electrical conductor.

In some embodiments, the former comprises copper, or stainless steel, or aluminum, or brass, or any combination thereof.

In some embodiments, the former comprises a flattened electric wire cable.

In some embodiments, the former comprises a non-electrically conductive material.

In some embodiments, the former comprises longitudinal slits separating two parallel surfaces of the former.

In some embodiments, the former comprises one or more channels for retaining a thermally conductive coolant fluid.

In some embodiments, each of the one or more flat tapes has a thickness of less than 0.2 mm and a width of between 0.1 mm and 12.0 mm.

In some embodiments, the superconductor of each of the one or more flat tapes comprises a rare earth barium copper oxide (REBCO) or a bismuth strontium calcium copper oxide (BSCCO).

In some embodiments, the one or more flat tapes are wound helically onto the former so that the superconductor in each such tape is in tension.

In some embodiments, one or more of the flat tapes are soldered to the former.

Some embodiments include a jacket for retaining the one or more flat tapes against a surface of the former.

In some embodiments, the one or more flat tapes comprise a first insulated tape and a second insulated tape that are wound onto the former in parallel and are configured to carry electrical currents in opposite directions.

Another embodiment is a method of making a superconducting cable, the method comprising providing a former having a cross-section that includes an obround; and winding one or more flat tapes helically onto the former, each flat tape comprising a superconductor.

In some embodiments, the former has raised helical ribs, and winding comprises winding the one or more flat tapes in parallel between the ribs.

In some embodiments, the former has helical grooves, and winding comprises winding each of the one or more flat tapes into a corresponding one of the grooves.

In some embodiments, winding comprises winding so that the superconductor in one or more of the flat tapes is in tension along its length.

Some embodiments include soldering one or more of the flat tapes to the former.

Some embodiments include forming a jacket around the former for retaining the one or more flat tapes against a surface of the former.

In some embodiments, winding the one or more flat tapes helically onto the former comprises unrolling a rolled tape from a flat tape spool.

In some embodiments, winding comprises simultaneously moving and rotating the former relative to the flat tape spool.

Some embodiments include using a laser beam cutter to slice the unrolled tape to form the one or more flat tapes prior to winding.

In some embodiments, slicing the unrolled tape comprises slicing the unrolled tape completely through to form a plurality of fine filaments.

In some embodiments, slicing the unrolled tape comprises slicing the unrolled tape partially through to form a plurality of conductors that share a structural substrate.

It is appreciated that the concepts, techniques, and structures disclosed herein may be embodied in other ways, and thus that the above summary of embodiments should not be viewed as comprehensive, but merely illustrative.

DESCRIPTION OF THE SEVERAL VIEWS OF THE DRAWINGS

The manner and process of making and using the disclosed embodiments may be appreciated by reference to the drawings, in which like elements have like numbers, and:

FIG. 1(a) schematically shows a side view of a flat superconducting tape of width $W_f$ wound helically on a cable former of width $W_c$ in accordance with an embodiment of the concepts, techniques, and structures disclosed herein;

FIG. 1(b) schematically shows an end view of the wound tape of FIG. 1(a);

FIG. 1(c) schematically shows a portion of a cross-section of an illustrative REBCO tape that may be used in accordance with the embodiment of FIGS. 1(a) and 1(b);

FIG. 6(a) illustrates a front view of a cable former according to an embodiment having raised, helical ribs and grooves for retaining filaments;

FIG. 6(b) shows an end view of the cable former of FIG. 6(a);

FIG. 6(c) shows an end perspective view of the cable former of FIGS. 6(a) and 6(b);

FIG. 10(a) is a cross-sectional view of a CICC whose former has slits to break loop currents, with coolant channels in the jacket;

FIG. 10(b) is a combined top- and end view of the unjacketed former of FIG. 10(a), showing longitudinal positions of the slits; and FIG. 10(c) is a cross-sectional view of a jacketed CICC whose former has slits to break loop currents, with coolant channels inside the former.

DETAILED DESCRIPTION OF EMBODIMENTS

Figure 2:
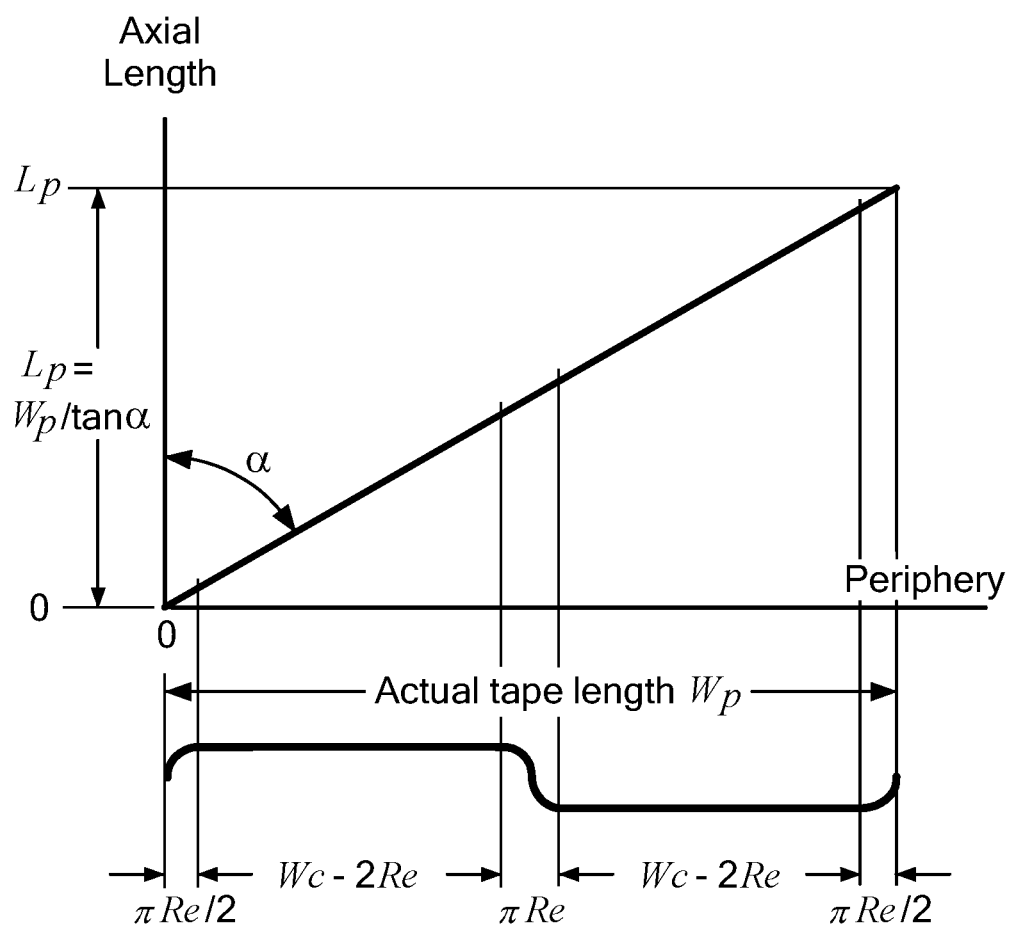
FIG. 2 illustrates the tape length as a function of the periphery of the former in an embodiment which has a corner radius $R_e$.

In this specification, including the appended claims, the following quoted terms shall have the indicated meanings that are not limited to specific embodiments, except where expressly indicated otherwise:

An "obround" is a rectangle having two opposite edges capped with semicircles.

In FIGS. 1(a) and 1(b) are schematically shown a side view and an end view, respectively, of a flat superconducting tape 10 of width $W_f$ wound helically on a generally obround former 12 having width $W_c$, in accordance with an embodiment of the concepts, techniques, and structures disclosed herein. More particularly, the most distant, opposing sides of the former 12 are rounded to avoid excessive tape bending, as seen in FIGS. 1(a) and 1(b)). To be precise, the former 12 has a cross-section that includes an obround, and is a Rutherford-type cable former. The helically twisted tape 10 has a twist-pitch $L_p$ and a twist-pitch angle α. The former may have a thickness that is less than 20 mm, and in particular may have a thickness that is between 0.5 mm and 5 mm. The former 12 may be made of an electrical conductor, such as copper, stainless steel, aluminum, brass, and may be formed by flattening an electric wire cable. The former 12 also may be made of a non-electrical material.

In accordance with embodiments, the flat-tape superconductor 10 is wound directly on the former 12 in a helical pattern. Advantageously, this cabling pattern provides a flat-tape variation of the Rutherford-type cabling method known previously only with round superconducting wires. In the prior art, only round wires were used because it was believed that bending a tape around the edges of a former would result in too severe a degradation in the key operating characteristics of the superconductor (e.g. critical current). However, it has been determined experimentally in connection with this disclosure that the degradation can be sufficiently mitigated by using the described design, and in particular by bending several tapes 10 around the former 12 not just longitudinally, but also latitudinally. That is, rather than winding a single tape helically around the former with a twist-pitch, several layers of the tapes are wound around the former, each layer with a greater bending diameter, thereby reducing the bending of each tape to acceptable performance levels.

In FIG. 1(c) is schematically shown a portion of a cross-section of an illustrative superconducting tape 14 that may be used in accordance with the embodiment of FIGS. 1(a) and 1(b), i.e. as flat tape 10. The superconducting tape 14 includes an epitaxial, superconducting yttrium barium copper oxide (YBCO) layer that is only about 1 micron thick, while the thickness of the entire tape is less than but approximately 100 microns (0.1 mm). The superconducting tape 14 may have a width that is between 0.5 mm and 5 mm, i.e. may be provided as a fine filament. It is appreciated that superconducting tapes that may be used in embodiments may more generally be rare earth barium copper oxide (REBCO) or a bismuth strontium calcium copper oxide (BSCCO), or other superconductor, especially other high-temperature superconductors (HTS).

Notably, the vertical structure of the superconducting tape 14 is asymmetric, and embodiments may take advantage of this asymmetry to reduce the performance degradation caused by bending. In particular, the bending direction of the superconducting tape 14 around a former (e.g. the former 12) has different effects on the superconducting characteristics of the tape 14. In particular, when the REBCO layer is faced inward to the former, if the superconducting tape 14 shown in FIG. 1(c) is bent at the round edge of the former so that the superconducting layer is compressed in the tape width direction, it results that the critical current of the REBCO tape 14 (hence the cable) will be increased since the superconducting layer is tensioned along the tape length due to the Poisson effect. That is, a compression in the width direction results in the superconductor being in tension in the length direction.

Therefore, the helical twist-winding of a flat tape on an obround former provides a cable having increased critical current in a design range of the edge bending diameter, except a very sharp bending. The flat-tape superconductors, when winding, are placed on a former selecting the tape surface direction (inward or outward against to the former) not to degrade the superconductor performance. Note that the edge bending of the embodiments is not disadvantaged for a flat tape cabling if the superconducting layer side is selected to be against the former.

Because embodiments use a flat tape, various disadvantages of using round wires are lacking. In particular, bundled flat-filaments may be wound in parallel at once on the former, and multiple layers of flat tape may be wound on top of each other without gaps to make multiple-layer cables. This design further allows good tape usage, in the sense that the ratio of the tape length and the cable length is approximately 1 since the twist-pitch length is much larger than the cable former width.

Moreover, manufacturing cost may be lowered to where industrial fabrication of fine-filament (e.g. ~0.1 mm width) flat-tape cabling is possible. Flat-tape cables made from fine filaments provide a superconducting cable for AC ramp-field and pulse-field applications with low AC losses. Fine filaments can decrease the hysteresis loss by reducing the tape width. Fine-filament cable also is good for reducing the undesired shield current in a superconductor.

In FIG. 2 is shown the tape length as a function of the periphery of the former, considering the rounding corners of the former. The corner radius of the former is $R_e$, and the twist angle of the tape is α (which is also shown in FIG. 1). The perimeter of the rectangular shape former, $W_p$, and the twist angle α are given as $$W_p = 2(W_c - 2R_e + \pi R_e) \quad (1)$$

$$\approx 2W_c \text{ if } R_e \ll W_e \quad (2)$$

$$\tan \alpha = W_p/L_p \quad (3)$$

The maximum filament number $n_{max}$ for a tight winding (100% surface density) is $$n_{max} = L_p \sin \alpha / w_f \quad (4)$$

$$= W_p \cos \alpha / w_f \quad (5)$$

-continued $$\approx 2W_c \cos\alpha / w_f \text{ if } R_e \ll W_c \quad (6)$$

Cable design parameters are defined as follows. Symbols described above are also summarized below:

N=the number of the total strands (bundled filaments) in a cable;

$n_s$=the number of the filaments in a strand;

$n_t$=the number of the total filaments in a cable, $n_t$=N*$n_s$;

$L_p$=the twist pitch;

$W_c$=the cable former width;

$R_e$=the radius of the former corner;

$W_p$=the perimeter of the rectangular shape former; and $w_f$=the filament width.

Figure 3D:
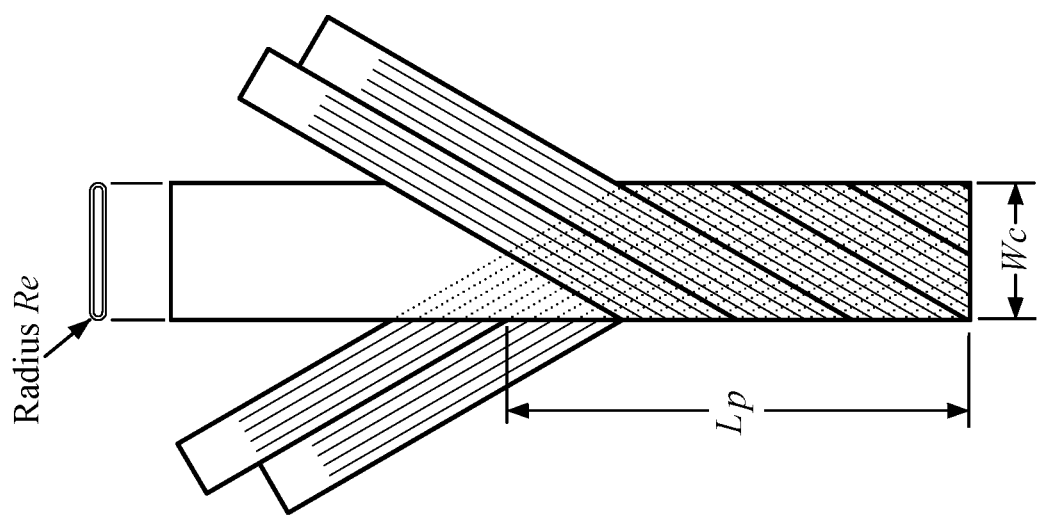
FIG. 3(d) shows a superconducting cable according to an embodiment comprising four strands of five filaments each.
Figure 3C:
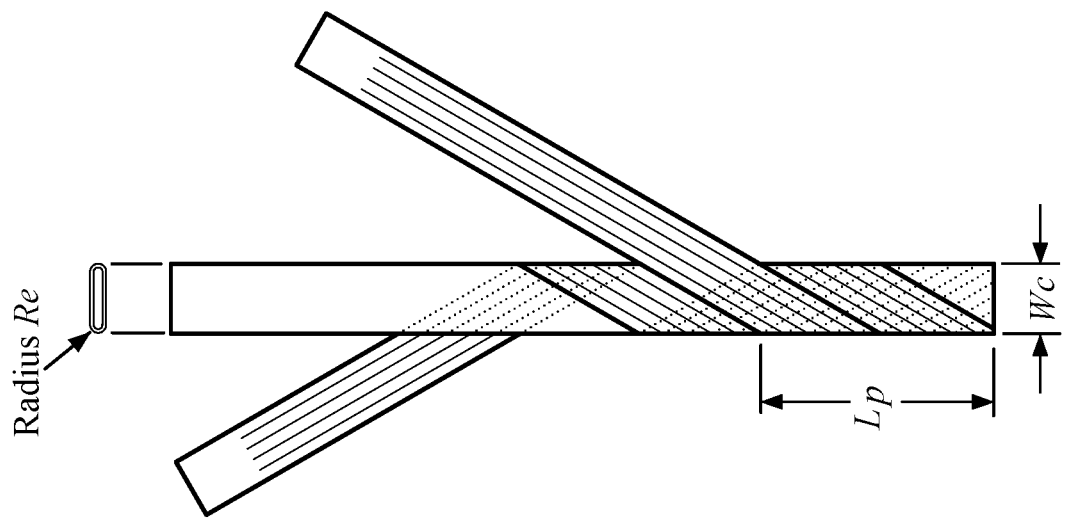
FIG. 3(c) shows a superconducting cable according to an embodiment comprising two strands of five filaments each.
Figure 3B:
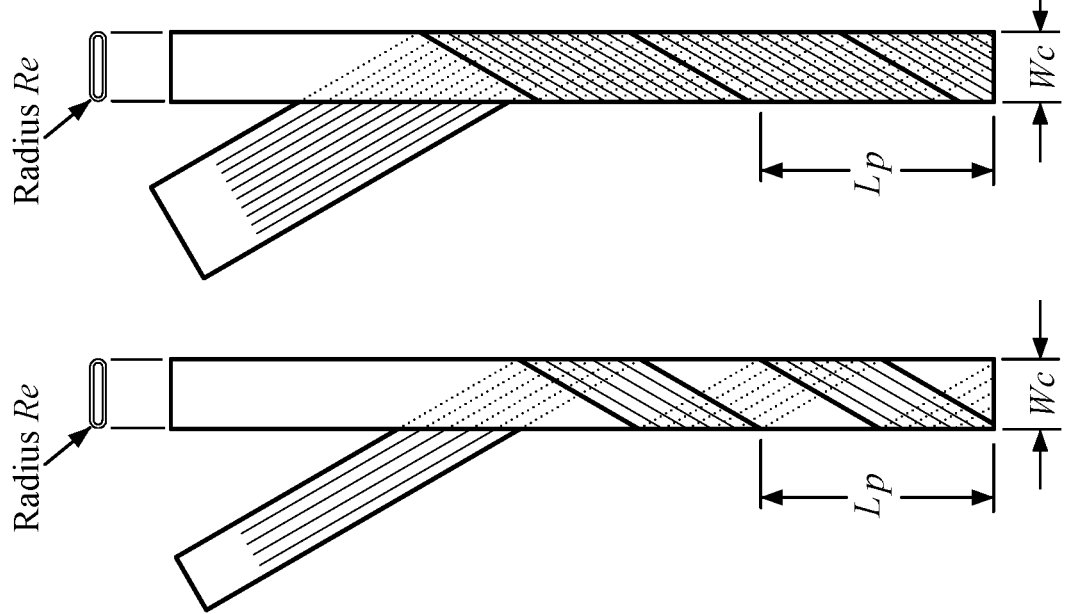
FIG. 3(b) shows a superconducting cable according to an embodiment comprising ten filaments in one bundled strand.
Figure 3A:
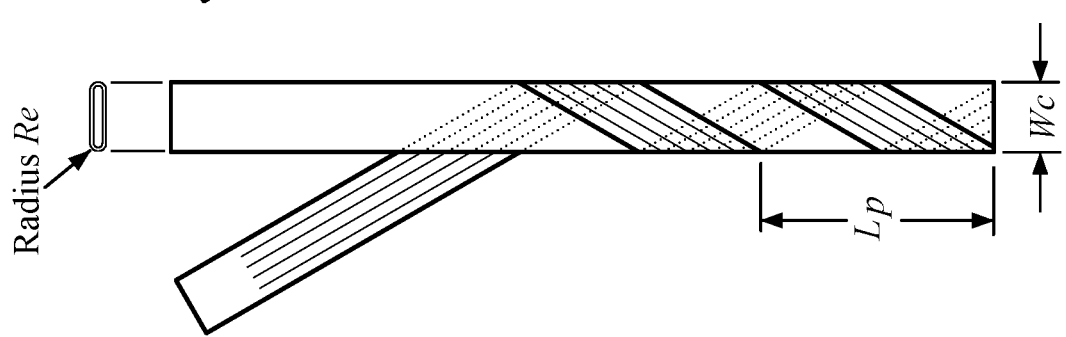
FIG. 3(a) shows a superconducting cable according to an embodiment comprising five filaments in one bundled strand.

Four examples of multiple-tape cables are illustrated in FIGS. 3(a)-3(d) (collectively "FIG. 3"). FIG. 3(a) shows a superconducting cable according to an embodiment comprising five filaments in one bundled strand. FIG. 3(b) shows a superconducting cable according to an embodiment comprising ten filaments in one bundled strand. FIG. 3(c) shows a superconducting cable according to an embodiment comprising two strands of five filaments each. And FIG. 3(d) shows a superconducting cable according to an embodiment comprising four strands of five filaments each. The twist-pitch is shown with $L_p$ in each figure.

Table I shows typical values of the design parameters of the four cables in FIG. 3, and also gives the critical currents of the cables which are evaluated using the filament critical current of 40 A at 77 K in self-field, and at the temperature 4.2 K at the field 18 T where the same critical current value is used.

Figure 4A:
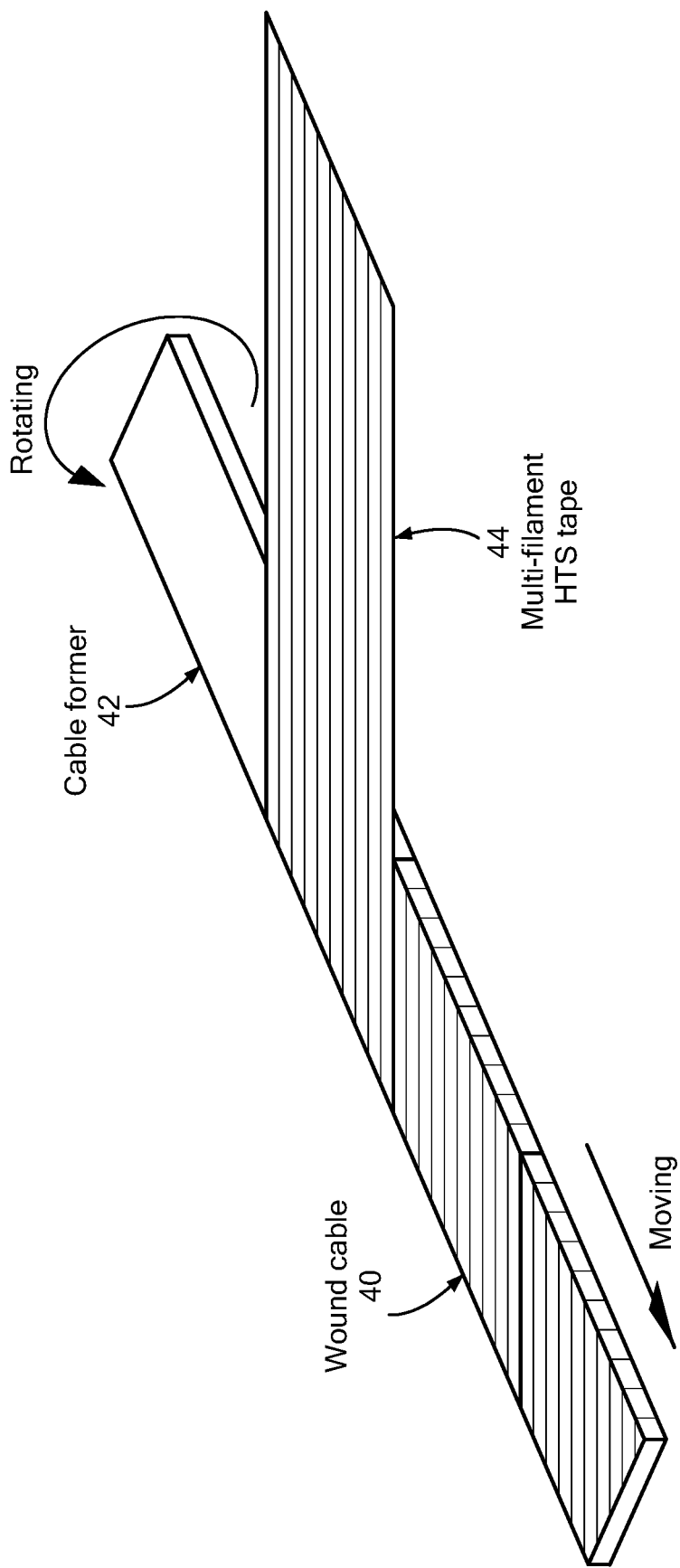
FIG. 4(a) is a cartoon schematically showing a method of making a superconducting cable according to an embodiment having a single layer of multiple, parallel filaments.
Figure 4B:
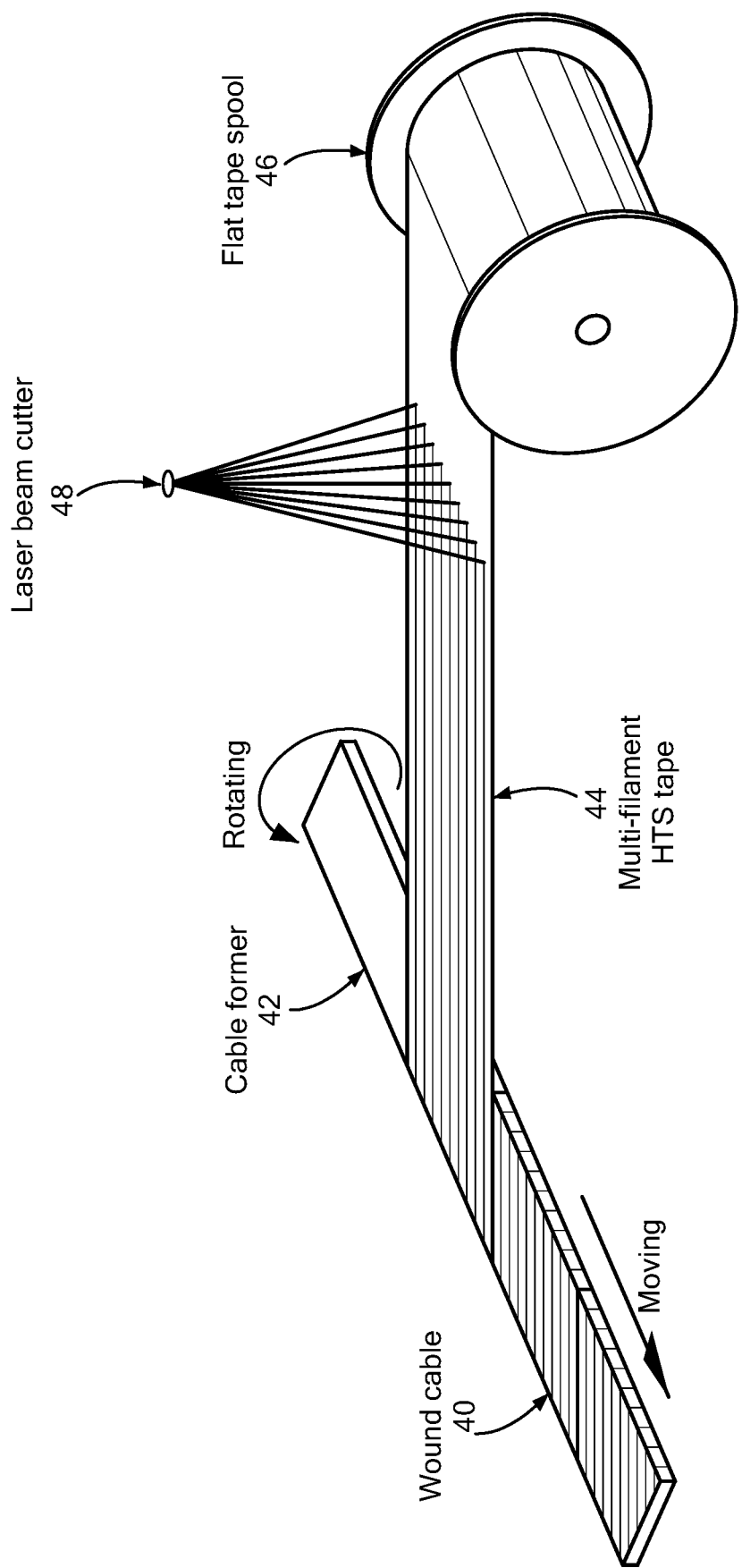
FIG. 4(b) is a cartoon schematically showing the method of FIG. 4(a) using a laser beam cutter to slice tape to form the parallel filaments.
Figure 4C:
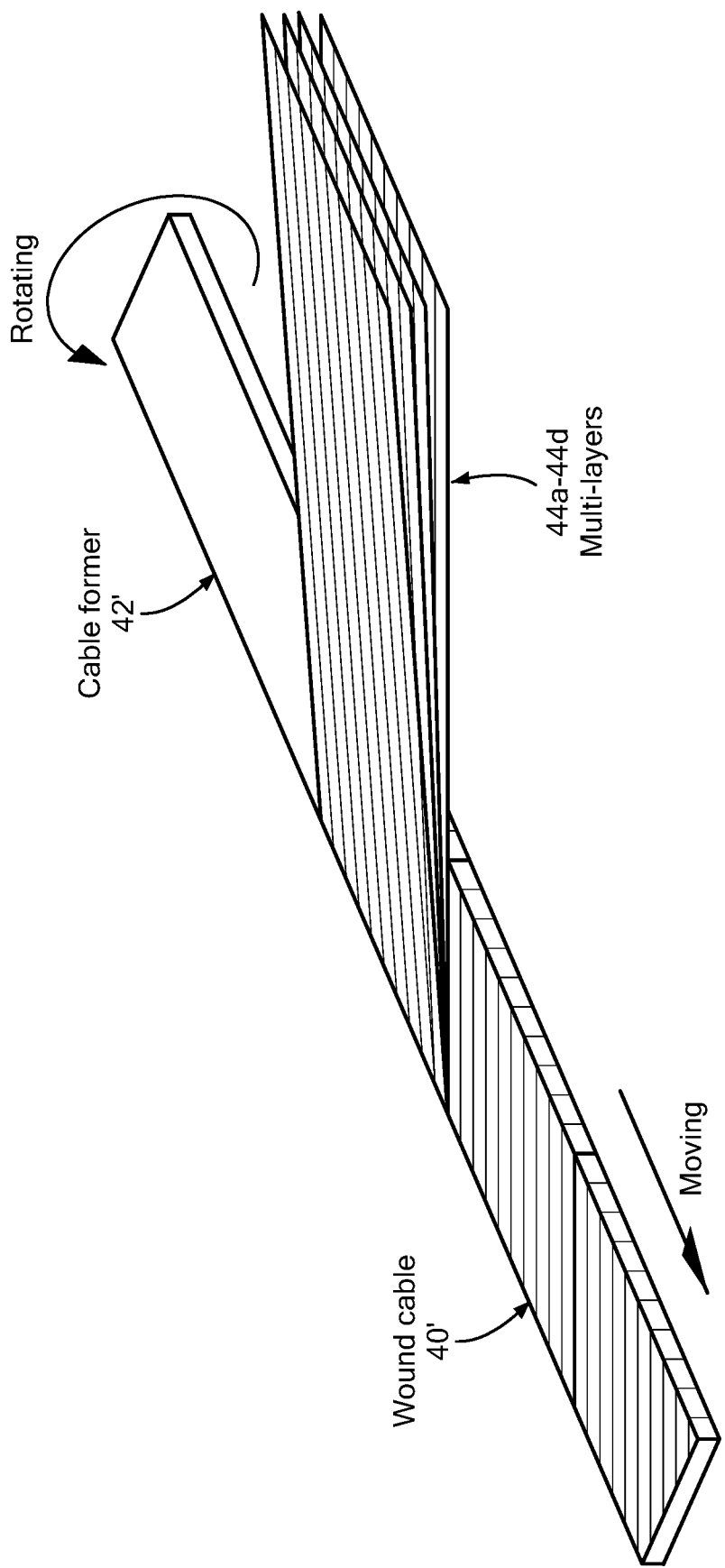
FIG. 4(c) is a cartoon schematically showing a method of making a superconducting cable according to an embodiment having multiple layers of multiple, parallel filaments.

FIG. 3 shows single layer cablings, as also shown in FIGS. 4(a) and 4(b) described below. Large cables may be fabricated with multiple layer windings on top of one another, as shown in FIG. 4(c). In Table I, the multiple layer cables are also shown. For example, 30 layers of FIG. 3(c) and 50 layers of FIG. 3(d) can provide 12 kA and 40 kA cable, respectively. The engineering current densities $J_e$ of the cables in the table are calculated for the former thickness of 1 mm and the tape thickness of 0.04 mm. A Rutherford-type-cabling of a REBCO conductor will achieve a high critical current density.

TABLE I

Cable design parameters of the cables shown in FIG. 3.

| Figure | 3(a) | 3(b) | 3(c) | 3(d) |
|---|---|---|---|---|
| The number N of strands | 1 | 1 | 2 | 4 |
| The number $n_s$ of the filaments in a strand | 5 | 10 | 5 | 5 |
| The total number $n_t$ of filaments in a single layer | 5 | 10 | 10 | 20 |
| Cable surface density (%) | 50 | 100 | 100 | 100 |
| Cable layer critical current $I_{ct}$ (A)* | 200 | 400 | 400 | 800 |
| The number $N_m$ of layers in a cable | 1 | 5 | 30 | 50 |
| The total number $n_f$ of filaments in a cable | 5 | 50 | 300 | 1,000 |
| Multiple-layer cable total critical current $I_{c\text{-}cable}$ (A)* | 200 | 2,000 | 12,000 | 40,000 |
| Cable engineering current density $J_e$ (A/mm²)** | — | 264 | 477 | 571 |

*Filament 1 mm width, $I_c$ = 40 A at 77 K and cable self-field or at 4.2 K and 18 T.
**Former thickness 1 mm and tape thickness 0.04 mm Various advantages can be realized in embodiments. The cable can provide two insulated electrical paths for a plus and minus loop current in a single conductor of one cable former. For example, in FIG. 3(c) each bundle of filaments can be insulated, and a loop current applied to the two bundled tapes. In this case, the self-field can minimize with the loop current. Therefore the critical current of the cable can increase. That is, the flat tapes comprise a first insulated tape and a second insulated tape that are wound onto the former in parallel and are configured to carry electrical currents in opposite directions.

A cable can be wrapped with multiple filaments and multiple layers. Thus, FIG. 4(a) is a cartoon schematically showing a method of making a superconducting cable 40 according to an embodiment having a single layer of multiple, parallel filaments. The superconducting cable 40 illustratively is the cable of FIG. 3(b), having a cable former 42 around which is wound a multi-filament flat-tape superconductor 44 having ten strands. The cable former 42 is simultaneously rotated and moved during winding, as shown in the embodiment of FIG. 4(a). In an alternate embodiment, the cable former 42 may be held fixed, and spools of bundled flat-tapes can be rotated around the cable former 42.

Thus, in FIG. 4(a) is shown a method of making a superconducting cable 40. The method includes providing a former 42 having a cross-section that includes an obround. And the method includes winding a flat tape 44 helically onto the former 42, the multi-filament flat tape 44 comprising a flat-tape superconductor, such as a high temperature superconductor (HTS).

FIG. 4(b) is a cartoon schematically showing the method of FIG. 4(a) using a laser beam cutter 48 to slice tape to form the parallel filaments. The superconducting tape is provided on a flat tape spool 46 without filaments. As the cable former 42 is rotated and moved, a flat tape is drawn from the spool 46 through a laser beam cutter 48, which creates the multi-filament flat tape 44 in tension for winding. It is appreciated that various embodiments may use the laser beam cutter 48 to slice the HTS tape fully through its substrate to form detached filaments, or to split only the superconducting layer for making fine superconducting filaments on a single substrate with other elements. A laser beam cutter 48 is used to avoid introducing defects into the filaments that could cause a loss of superconductivity. Advantageously, creating fine filaments immediately before winding avoids the need to spool (or re-spool) the filaments, which can damage them.

Usually, REBCO tapes are fabricated on a substrate of 12 mm to 20 mm width. The original width is split between thirds and fifths. To reduce AC losses in actual use, however, much narrower-width filamentary tapes of 1 mm or less are desired, sometimes as low as 0.1 mm, and the overall width of each tape therefore is between 0.1 mm and 12.0 mm. The filaments of the narrow width tapes can be split and are directly mounted on a former. A superconducting thin tape is cut to fine filaments illustratively by a laser beam cutting technique (e.g. via the laser beam cutter 48) or other methods. Thus, multiple filament strands of flat-tape superconductor 44 can be wound on the cable former 42 directly after cutting the filaments. In this way, handling of fine filaments and fabrication of fine filament cabling are combined in a manner that is easy and economical.

Thus, in FIG. 4(b) is shown the method of FIG. 4(a) in which winding the flat tape 44 helically onto the former 42 comprises unrolling a rolled tape from a flat tape spool 46. Moreover, winding may comprise simultaneously moving and rotating the former 42 relative to the flat tape spool 46. And the method may further comprise using a laser beam cutter 48 to slice the unrolled tape to form the flat tape 44 prior to winding. In some instances, slicing the unrolled tape comprises slicing the unrolled tape completely through to form a plurality of fine filaments. In other instances, slicing the unrolled tape comprises slicing the unrolled tape partially through to form a plurality of conductors that share a structural substrate, as described above.

FIG. 4(c) is a cartoon schematically showing a method of making a superconducting cable 40' according to an embodiment having multiple layers of multiple, parallel filaments 44a-44d. The embodiment shown in FIG. 4(c) is similar to that shown in FIG. 4(a), in that it produces a wound cable 40' by winding flat-tape superconductor around a cable former 42' that is rotating and moving. However, the embodiment shown in FIG. 4(c) is different to that shown in FIG. 4(a), in that it simultaneously winds multiple layers 44a-44d of sliced tape at once to form a multi-layered cable 40a. The multiple layers 44a-44d may be provided using respective tape spools and a single laser beam (as shown in FIG. 4(b)), if the laser beam cutter slices completely through each unrolled tape in the stack. If it is desired, however, for each of the multiple layers 44a-44d to be sliced only partially through, then multiple laser beam cutters may be used. As defects may occur in individual tapes, the multiple layer embodiment shown in FIG. 4(c) may be used advantageously to route around defects in one layer or one filament by directing operating current through an adjacent, touching layer or filament in the stack of layers.

It is appreciated that large numbers of layers may be stacked on a single former 42' to form the wound cable 40'. Thus, the depiction in FIG. 4(c) of exactly four layers should be viewed as illustrative only, and not necessary. Indeed, as few as one layer may be used, as shown in FIG. 4(a), and any larger number of layers may be used according to the geometry of the former 42' and the thickness of the layers. As shown in FIG. 6 and described below, the former 42' may be provided with structural members to guide placement of very many layers in precise mutual registry.

Thus, in FIG. 4(c) is shown a method of making a superconducting cable 40' that includes providing a former 42' having a cross-section that comprises an obround, and winding one or more flat tapes 44a-44d helically onto the former 42', each flat tape 44a-44d comprising a flat-tape superconductor, such as high temperature superconductor (HTS). The method shown in FIG. 4(c) of course may be used in connection with unrolling tape from a flat tape spool and using one or more laser beam cutters, as described more fully above in connection with FIG. 4(b).

Advantageously, embodiments uniformly place filaments 44 in parallel in a cable 40. Therefore, inductance distribution among the tapes can become uniform. Each filament can carry the same or similar currents from the symmetry arrangement of the filaments and the uniform inductance distribution. It is desired to make uniform current distribution among parallel tapes of a multiple superconducting tape cable.

The corner diameter can be made as small as possible to increase the cable current density. Regarding the twist-pitch for winding tapes, the corner diameter can be chosen in view of the bending degradation of the flat-tape superconductor, the stability of the superconductor and minimizing the eddy-current loss. In particular, the corner diameter of the former 42 according to embodiments can be as small as about 1 mm or less for REBCO tape filaments. The narrow filament can allow to practically mount on a smaller diameter than wider tapes.

Figure 5A:
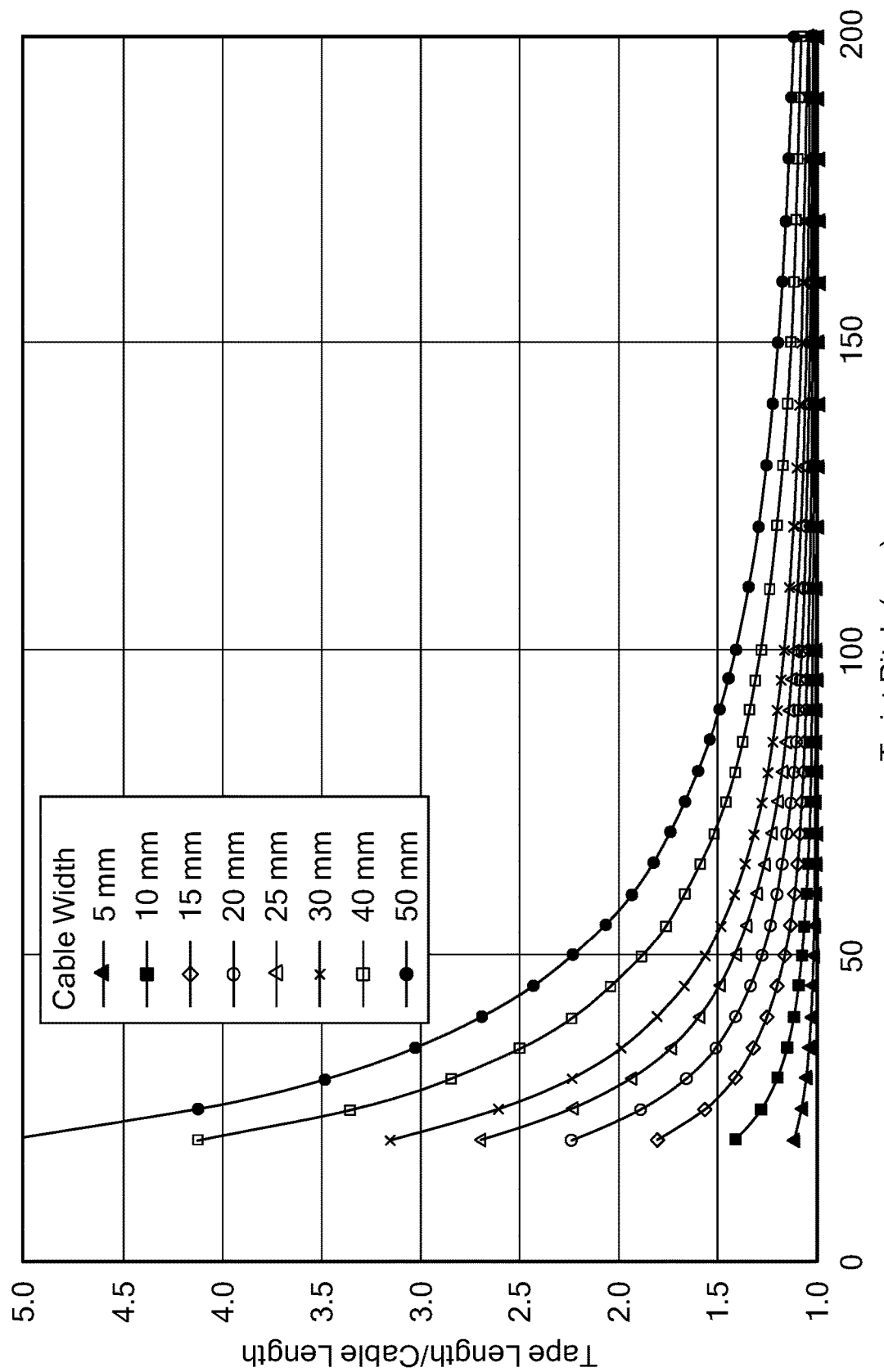
FIGS. 5(a) and 5(b) are plots of tape length as a function of twist pitch for various cable former widths in an embodiment.
Figure 5B:
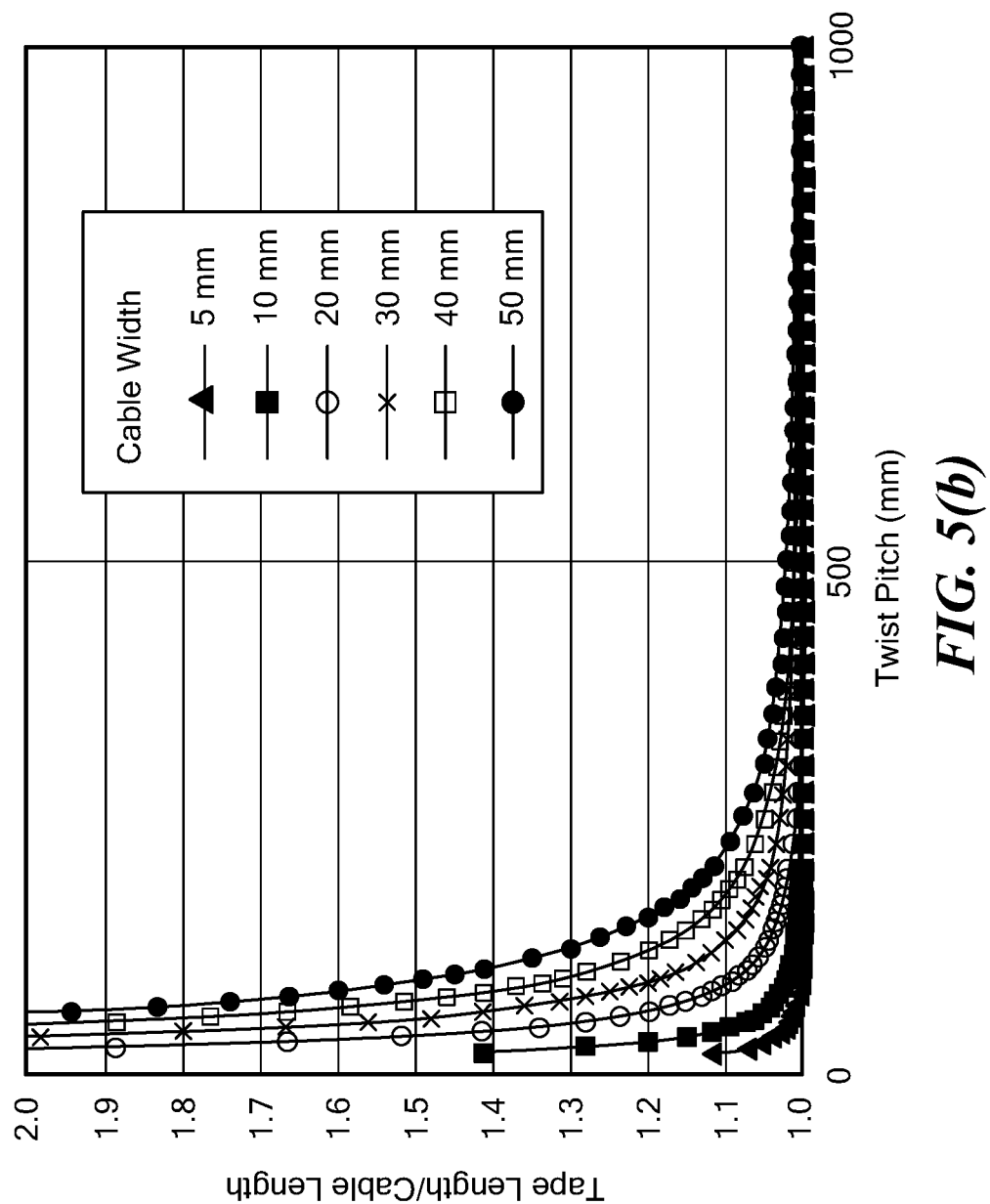

In FIGS. 5(a) and 5(b) are shown plots of tape length as a function of twist pitch for various widths of cable. Tape length wound helically on a cable former, such as that shown in FIG. 1, is given per a twist pitch by:

$$\sqrt{Lp^2 + 4Wc^2} \quad (7)$$

The ratio of the tape length/the cable length is given as:

$$\sqrt{Lp^2 + 4Wc^2} / Lp = \sqrt{1 + 4(Wc/Lp)^2} \quad (8)$$

$$\approx 1 + 2(Wc/Lp)^2 \quad (9)$$

The ratios of the tape length and the cable length are plotted in FIG. 5(a) for the twist-pitches up to 200 mm with the various widths of the former. For the twist-pitch of 200 mm, the ratios are 1.005 and 1.02 for the former widths of 10 mm and 20 mm, respectively. The tape lengths for these cables are approximately the same as the cable length if the twist-pitch is more than 200 mm. FIG. 5(b) shows the ratio of the tape length and the cable length for the twist-pitches up to 1 m. The ratio for the twist-pitch of 1 m is 1.005 for the former width of 50 mm. The disclosed cabling method for a flat-tape superconductor advantageously has a ratio of the tape length to the cable length of approximately 1.

FIGS. 6(a), 6(b), and 6(c) (collectively "FIG. 6") illustrate a cable former 60 according to an embodiment having raised, helical ribs. FIG. 6(a) shows the front view of the cable former 60, FIG. 6(b) shows the end view of the cable former 60, and FIG. 6(c) shows an end perspective view of the cable former 60. The former 60 provides mechanical support during cable fabrication, and also it supports the superconducting tape against electromagnetic force during operation.

To make the support effective both during manufacturing and operation, ribs 62a, 62b, 62c, 62d (collectively ribs 62) can be helically provided on the surface of the former 60, as seen in FIG. 6. The ribs 62 can be fabricated as part of the surface of the former 60, or they can be provided by mounting or welding helically to a surface of the former. They can be manufactured before winding the filaments 64, or co-wound during cable winding. Thus, making the superconducting cable may include winding the one or more flat tapes or filaments 64 in parallel between the ribs 62.

The filaments 64 are wound between the ribs 62. Multiple filaments 64 bundled in a strand can be placed between the ribs 62. In alternate embodiments, rather than forming ribs 62 on the surface of the former 60, helical grooves may be etched (or otherwise manufactured) below the surface, or the wires welded on the former to produce a similar structure, and winding the cable may include winding the one or more flat tapes or filaments 64 into a corresponding one of the grooves.

The filaments 64 can be soldered on the former 60 during winding, or after the cable winding. The solder is useful for enhancing mechanical support for the tapes, a current sharing and increasing the stability margin. Solder material should be appropriately selected according to electrical conductivity, thermal conductivity, melting temperature, and mechanical properties to reduce AC losses. Non-metallic material can be used such as epoxy, Sycast®, and similar materials that are liquid at room temperature but which are frozen at lower, operational temperatures to support the cable. Electrically conductive paints and epoxy materials can be used if desired.

It is appreciated that the cable formers described above represent simple variations of the most general aspects of embodiments. In particular, cables can be fabricated into cable-in-conduit conductors (CICC) which are used for various high-current cable applications, such as fusion reactors, high energy physics devices, superconducting magnetic energy storage (SMES), medical applications, and industrial motors and generators.

Figure 7A:
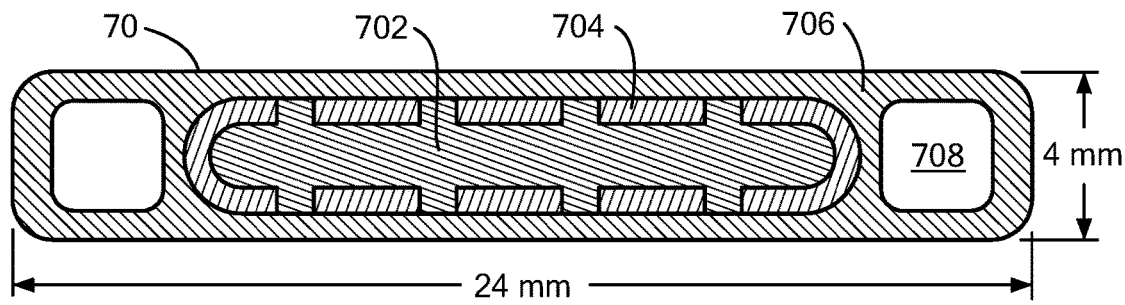
FIG. 7(a) shows a cross-section of a superconducting cable-in-conduit conductor (CICC) according to an embodiment having a jacket with coolant channels.
Figure 7B:
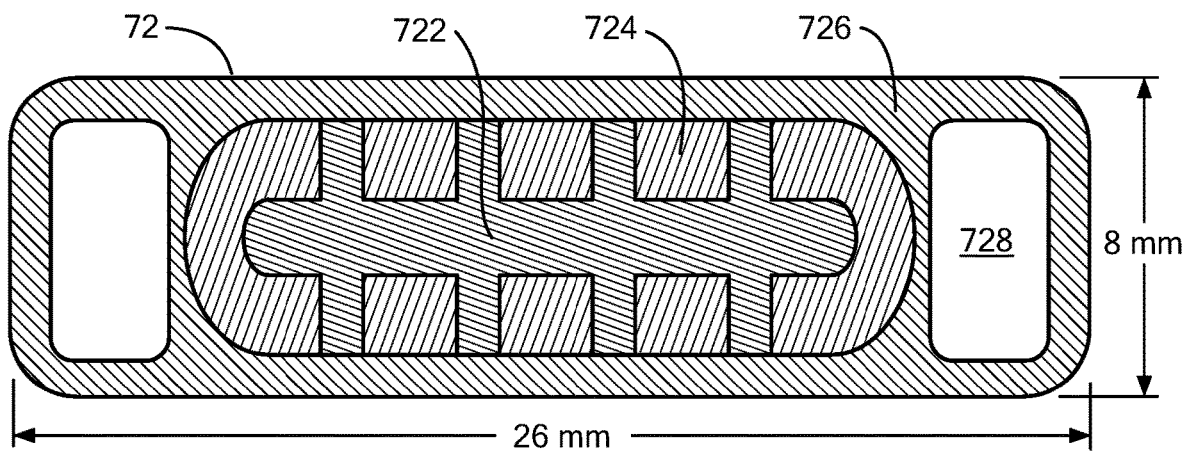
FIG. 7(b) shows a cross-section of a CICC according to another embodiment having a jacket with coolant channels.
Figure 7C:
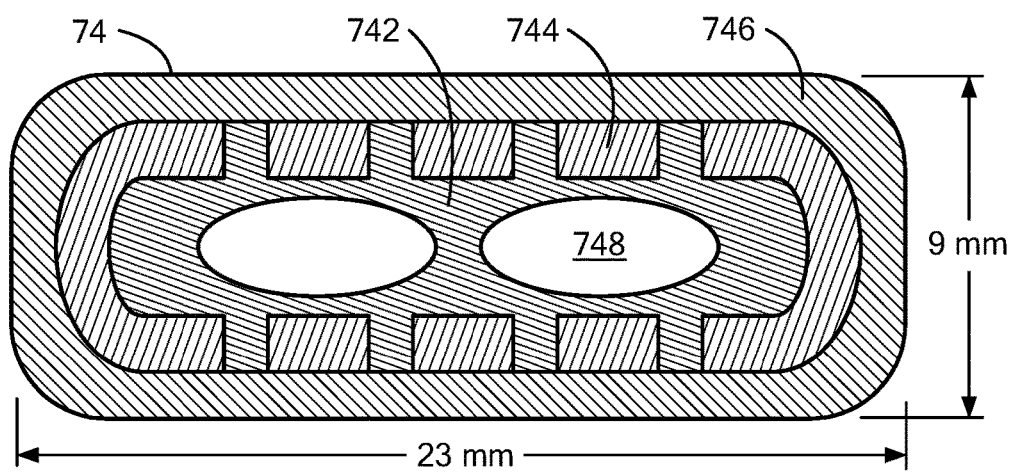
FIG. 7(c) shows a cross-section of a CICC according to another embodiment having a jacket, with coolant channels inside the former.

FIGS. 7(a), 7(b), and 7(c) (collectively "FIG. 7") show three types of cable-in-conduit-conductors (CICC), which are designed for the flat tape Rutherford cables. These cables 70, 72, 74 have coolant channels 708, 728, 748 to cool the cables with liquid nitrogen, liquid hydrogen, and gas and liquid helium. Soldering and epoxy filling material can be feed into the conduit from the end after the CICC fabrication. Various embodiments may use REBCO tape cables. In FIG. 7, approximate dimensions of the CICC for 12 kA to 32 kA currents are given as illustrative of a compact cabling.

Thus, in FIG. 7(a) is shown a cross-section of a superconducting cable-in-conduit conductor (CICC) 70 according to a first embodiment having a jacket with coolant channels. The CICC 70 has a cable former 702 having ribs, in a manner similar to that shown in FIG. 6. The former 702 of the CICC 70 can be metallic material, such as copper, aluminum, stainless steel, or brass. However, it is not necessary for the former 702 to be a metal, and non-metallic material can also be used, such as plastic. The CICC 70 also has filaments wound between the ribs, of which flat-tape superconductor filament 704 is illustrative. The filaments are then mechanically coupled to the former 702, as described above. The assembly is then covered with a jacket 706, using materials and techniques known in the art for such encasement. Soldering of the conductor can be performed before or after the jacketing 706.

The jacket 706 may retain one or more flat tapes comprising the filaments against a surface of the former 702. Notably, the CICC 70 cools and removes a great deal of heat during operation, and the jacket 706 therefore includes one or more voids or cooling-channels, of which channel 708 is illustrative, through which to flow a thermally conductive liquid coolant to carry away this heat as known in the art.

FIG. 7(b) shows a cross-section of a CICC 72 according to a second embodiment having a jacket with coolant channels. The CICC 72 is similarly configured to CICC 70, but each component is larger. Thus, the CICC 72 includes a former 722 having ribs, through which are wound one or more layers of HTS filaments of which filament 724 is illustrative. The assembly is surrounded with a jacket 726 having two coolant channels, of which channel 728 is illustrative.

FIG. 7(c) shows a cross-section of a CICC 74 according to an embodiment having a jacket, with coolant channels inside the former. The CICC 74 differs from CICCs 70, 72 in that the coolant channels are provided inside the former itself. Thus, the CICC 74 includes a former 742 having two coolant channels for retaining a thermally conductive fluid, of which channel 748 is illustrative. The coolant channel can be separated into multiple channels to provide efficient cooling and sufficient support against the electromagnetic force of the conductor during operation. One or more layers of filaments 744 are wound through ribs in the former 742, and the entire assembly is encased in a jacket 746.

The formers 702, 722, 742 each can be essentially a flat plate with round corners, and can be fabricated by flattening a round material into a flat plate, flattening a round material into a flat plate with the helical ribs by a rolling mill or other methods, by extrusion, or combining these methods. Using the flattening method of a round material allows fabricating flat cabling on an obround by flattening a round former to an obround shape after winding the flat-tape superconductor.

The CICCs 70, 72, 74 each include a former with ribs, in the manner shown in FIG. 6. It is appreciated, however, that CICC embodiments need not always have formers that include ribs. In particular, CICC embodiments may wind filaments directly on an outer surface of the former, as shown in FIGS. 1, 3, and 4(a)-4(c).

The CICCs 70, 72, 74 each show four ribs on each of a top and bottom surface, with three grooves between and a groove on either of the rounded corners of the obround. It is appreciated, however, that CICC embodiments may include any number of ribs or grooves, include none if the filaments are wound directly on a flat surface of the respective former.

The CICCs 70, 72 each have a jacket with two coolant channels, and the CICC 74 has a former with two coolant channels. It is appreciated, however, that CICC embodiments may include any number of coolant channels as known in the art, and the depiction of two channels is merely illustrative.

The CICC 70 has a vertical dimension of about 4 mm, and a horizontal dimension of about 24 mm. Thus, the former 702 may have a vertical measurement of about 3 mm, and the filaments wound between the ribs may have a similar width and a thickness of about 0.1 mm as shown in FIG. 1(c). Thus, there is ample room in the CICC 70 for one, and perhaps several layers of HTS filaments 704 to be wound in the space between the ribs of the former 702. Similarly, the CICC 72 has a vertical dimension of about 8 mm and a horizontal dimension of about 26 mm, and the CICC 74 has a vertical dimension of about 9 mm and a horizontal dimension of about 23 mm. It is appreciated, however, that these measurements are merely illustrative, and other embodiments may have different dimensions.

The former used in various embodiments can be essentially a flat plate with round corners. However, it is not limited to an obround of a flat rectangular shape. It can have an oval cross-section. The former can also be made of a flattened wire cable instead of a plate.

Figure 8A:
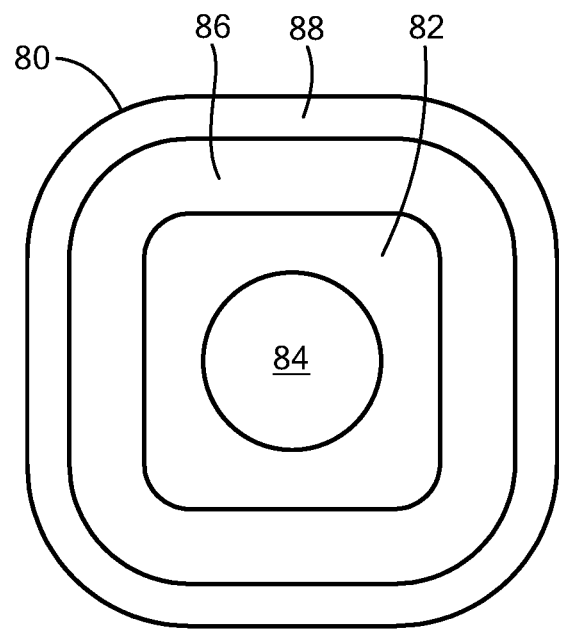
FIG. 8(a) is an end view of a CICC according to an embodiment having a cable former whose cross-section is a square with rounded corners and containing a central coolant channel.
Figure 8B:
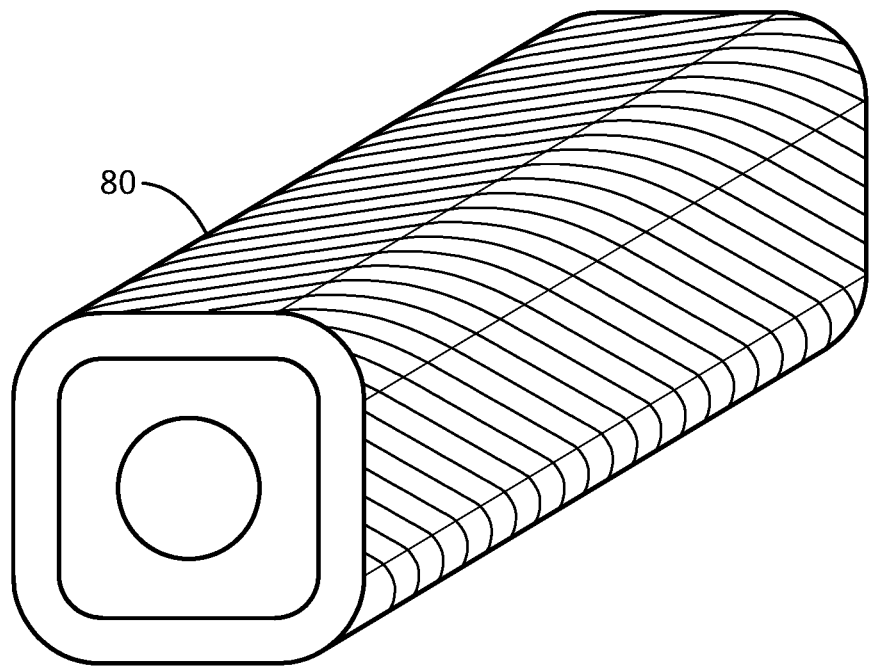
FIG. 8(b) is an end perspective view of the CICC of FIG. 8(a)

Furthermore, the former can be a square or nearly a square as shown in FIGS. 8(a) and 8(b) (collectively "FIG. 8"), in which flat-tape superconductors are wound helically with a given twist-pitch on the former surface using as many layers as required. The square former can have a coolant center channel for a CICC type conductor, and the cable is in a conduit.

Thus, in FIG. 8(a) is shown an end view of a CICC 80 according to an embodiment having a cable former 82 whose cross-section is a square with rounded corners and containing a central coolant channel 84, tape windings 86, and a jacket 88. FIG. 8(b) shows an end perspective view of the CICC 80 with the jacket removed, showing the filament windings.

FIG. 8 shows an example of flat tapes 86 cable-wound on a square former 82, but cables of other embodiments can be fabricated with formers of other shapes such as triangular, pentagonal, and so on if desired. In more detail, composite cable comprising multiple flat cables around a non-rectangular former can be made with a few or several flat cables. The cables can be transposed to reduce the coupling losses and make handling easy, so that the multiple cable arrangement can be twisted along the center axis. The multiple cables can be a CICC type conductor with cooling channels internally, if desired.

Figure 9:
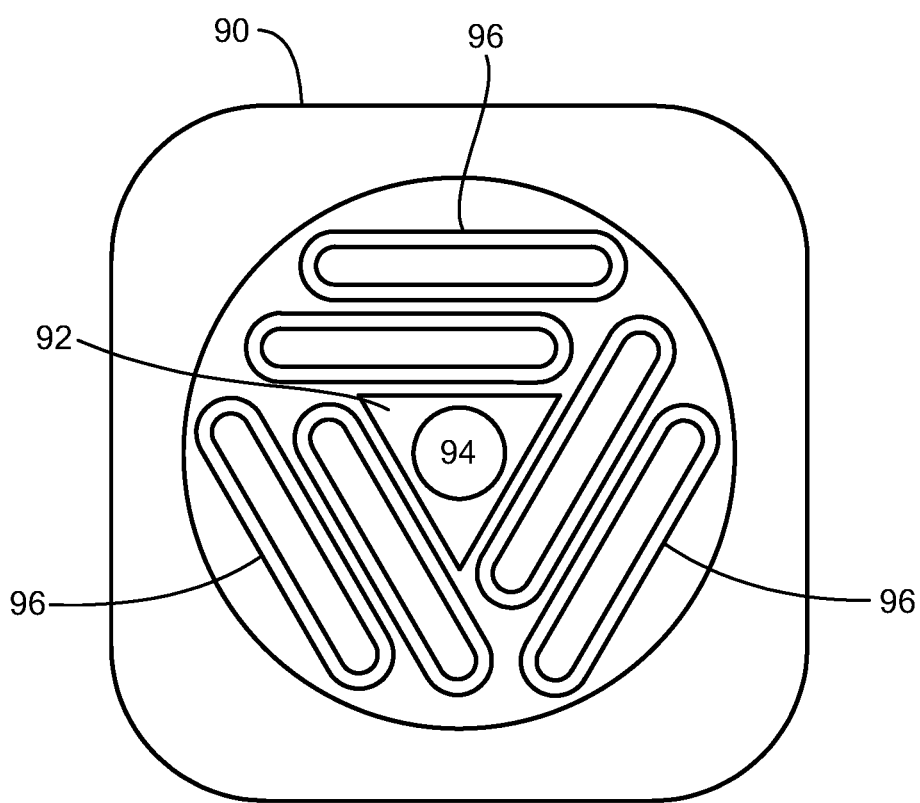
FIG. 9 is an end view of a CICC according to an embodiment having a cable former with a triangular cross-section and coolant channel, around which are wound six flat cables according to FIGS. 1(b) and 3.

Thus, an alternate cable former is shown in FIG. 9, which is a cross-section view of a CICC 90 according to an embodiment having a helically-twisted cable former 92 with a triangular cross-section and coolant channel 94, around which are wound six flat cables 96 according to FIGS. 1(b)

and 3. The former 92 is helically twisted along its length. On the former 92, additional cables 96 are helically arranged, two per side of the former 92, with a given twist-pitch. The helically-twisted former 92 can have a coolant channel 94 at the center to form a CICC-type conductor. The cables 96 are shown in FIG. 9 as having the cross-section of the cables shown in FIGS. 1(b) and 3. The cable former 92 is shown as having a triangular cross-section, but can be made with having cross-sections of a square, pentagon, and so on, provided that those other shapes stack appropriately around the former 92.

In embodiments, the former can generate a coupling eddy current with the parallel component of the magnetic field to the conductor when the superconductor is charged by a ramp current (such as AC current and pulsed currents). This loop current is the origin of AC losses. To reduce the AC losses, any current loops in the former should be eliminated as much as possible by cutting the eddy current loops. This is done by modifying the former to introduce longitudinal slits separating two parallel surfaces of the former, as illustrated in FIGS. 10(a), 10(b), and 10(c).

Thus, FIG. 10(a) is a cross-sectional view of a jacketed CICC 100 whose former 104 has slits 102a, 102b to break loop currents. The CICC 100 has coolant channels in the jacket as in FIGS. 7(a) and 7(b). FIG. 10(b) is a combined top- and end view of the unjacketed former 104 and the windings, showing longitudinal positions of the slits 102a, 102b. It may be seen that the slits 102(a) and 102(b) do not run down the entire length of the former, but rather exist only along overlapping longitudinal extents. And FIG. 10(c) is a cross-sectional view of a jacketed CICC 120 whose former 124 has slits 122a, 122b, 122c to break loop currents, with coolant channels inside the former.

In more detail, in FIGS. 10(a) and (c) the formers have a generally rectangular shape comprising an obround at the center of the respective CICC. Generated loop currents are shown with dotted lines. To cut the loops, slits are applied in the former. Note that the slits do not need to be continuous along with the former. They can be applied partially to effectively cut the loop currents, without reducing the strength of the former to support mechanical forces obtained during fabrication and operation of the superconductor cable, as shown in FIG. 10(b).

In FIG. 10(a), if the slit areas 102a and 102b are connected in the center, the strength of the former 104 becomes weaker. To avoid the weakening, the slits should not connect but be separated, as shown in FIG. 10(b).

In the case of FIG. 10(c), it is better not to split the former 124 into two pieces. Two cuts 122a and 122b, or 122a and 122c, or 122b and 122c will be enough to break the loop currents and reduce the AC losses. Also, the slit locations of 122a and 122b can be shifted as shown in FIG. 10(b). Note that if slits 122a and 122b are cut, the solder material used to secure the filaments to the former can leak into the cooling channels when the cable section is soldered. To prevent the solder leak, the slits 122a and 122b must be sealed with filling material and high-temperature solder after cutting. To avoid this complication, slits 122a and 122b in FIG. 10(c) should not be split.

In order to eliminate the loop eddy current, it is ideal to insulate the cutting section. However, in some embodiments this is not required. Rather, resistive materials such as stainless steel may be inserted into the cutting section so that they can mechanically support the slit section. The slit section can be filled with any materials such as epoxy, insulation spray materials, soldering materials, and any other materials.

To reduce AC losses, the material of the formers in these embodiments should be properly selected. Higher electric resistive elements have fewer AC losses; however, a better electrically conductive material such as oxygen-free, high-conductivity (OFHC) copper is desired for the former since it is suitable for a current bypassing when the superconductor becomes resistive. It is important to optimize the selections of electrical and mechanical characteristics of the former material. Also, it is important to treat the surface of the former and the filling materials with electro plating to obtain proper surface contact resistances, and to anneal the former and the filling materials if need.

It is noted that the disclosed superconductor cable can be easily jointed with a uniform low resistance termination. The cable termination can be fabricated by removing the conduit material of a CICC after making the cables for a magnet and a power cable. The overlapping tapes of the multiple-layer cable may be partially disassembled at termination for fabricating a ladder-type joint and expose the superconductor layer sides of the tapes to a copper or aluminum terminator for making joint resistances low and uniform.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A superconducting cable comprising:
   a former having a cross-section that includes an obround and having a thickness that is between 0.5 mm and 5 mm; and
   one or more flat tapes, each flat tape comprising a superconductor and being wound helically onto the former wherein a twist-pitch length of each flat tape is larger than a width of the former.

2. The superconducting cable of claim 1, wherein the former comprises raised helical ribs, and the one or more flat tapes are wound in parallel between the ribs.

3. The superconducting cable of claim 1, wherein the former comprises an electrical conductor.

4. The superconducting cable of claim 1, wherein the former comprises longitudinal slits separating two parallel surfaces of the former.

5. The superconducting cable of claim 1, wherein the former comprises one or more channels for retaining a thermally conductive coolant fluid.

6. The superconducting cable of claim 1, wherein each of the one or more flat tapes has a thickness of less than 0.2 mm and a width of between 0.1 mm and 12.0 mm.

7. The superconducting cable of claim 1, wherein the superconductor of each of the one or more flat tapes comprises a rare earth barium copper oxide (REBCO) or a bismuth strontium calcium copper oxide (BSCCO).

8. The superconducting cable of claim 1, wherein the one or more flat tapes are wound helically onto the former so that the superconductor in each such tape is in tension.

9. The superconducting cable of claim 1, further comprising a jacket for retaining the one or more flat tapes against a surface of the former.

10. A superconducting cable comprising:
a former having a cross-section that includes an obround; and
one or more flat tapes, each flat tape comprising a superconductor and being wound helically onto the former, wherein the one or more flat tapes comprise a first insulated tape and a second insulated tape that are wound onto the former in parallel and are configured to carry electrical currents in opposite directions.

11. A method of making a superconducting cable, the method comprising:

providing a former having a cross-section that includes an obround and having a thickness that is between 0.5 mm and 5 mm; and winding one or more flat tapes helically onto the former, each flat tape comprising a superconductor wherein a twist-pitch length of each flat tape is larger than a width of the former.

12. The method of claim 11, wherein the former has raised helical ribs, and winding comprises winding the one or more flat tapes in parallel between the ribs.

13. The method of claim 11, wherein winding comprises winding so that the superconductor in one or more of the flat tapes is in tension.

14. The method of claim 11, further comprising soldering one or more of the flat tapes to the former.

15. The method of claim 11, further comprising forming a jacket around the former for retaining the one or more flat tapes against a surface of the former.

16. The method of claim 11, wherein winding the one or more flat tapes helically onto the former comprises unrolling a rolled tape from a flat tape spool.

17. The method of claim 16, wherein winding comprises simultaneously moving and rotating the former relative to the flat tape spool.

18. The method of claim 16, further comprising using a laser beam cutter to slice the unrolled tape to form the one or more flat tapes prior to winding.

19. The method of claim 18, wherein slicing the unrolled tape comprises slicing the unrolled tape completely through to form a plurality of fine filaments, or slicing the unrolled tape partially through to form a plurality of conductors that share a structural substrate.

\* \* \* \* \*